United States Patent
He et al.

(10) Patent No.: US 11,216,647 B2
(45) Date of Patent: Jan. 4, 2022

(54) ANTI-SPOOFING LIVE FACE SENSING FOR ENHANCING SECURITY OF FACIAL RECOGNITION

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/734,259

(22) Filed: Jan. 3, 2020

(65) Prior Publication Data
US 2020/0218887 A1 Jul. 9, 2020

Related U.S. Application Data

(60) Provisional application No. 62/788,749, filed on Jan. 4, 2019.

(51) Int. Cl.
*G06K 9/00* (2006.01)

(52) U.S. Cl.
CPC ..... *G06K 9/00288* (2013.01); *G06K 9/00281* (2013.01); *G06K 9/00906* (2013.01); *G06K 2009/00932* (2013.01)

(58) Field of Classification Search
CPC .......... G06K 9/00288; G06K 9/00906; G06K 9/00281; G06K 2009/00932; G06K 9/2036; G06K 9/00255
See application file for complete search history.

(56) References Cited

U.S. PATENT DOCUMENTS

| | | | |
|---|---|---|---|
| 9,594,969 B1 | 3/2017 | Negi et al. | |
| 9,886,639 B2* | 2/2018 | Martin | G06K 9/00912 |
| 10,733,275 B1* | 8/2020 | Knas | G06F 21/32 |
| 2006/0279726 A1* | 12/2006 | Galambos | G06K 9/00221 356/71 |
| 2007/0092115 A1* | 4/2007 | Usher | G06K 9/00906 382/117 |

(Continued)

FOREIGN PATENT DOCUMENTS

| | | |
|---|---|---|
| CN | 1849614 A | 10/2006 |
| CN | 104766039 A | 7/2015 |

(Continued)

OTHER PUBLICATIONS

International Search Report dated Mar. 26, 2020 for International Patent Application No. PCT/CN2019/130509, filed Dec. 31, 2019 (4 pages).

*Primary Examiner* — Wesley J Tucker
(74) *Attorney, Agent, or Firm* — Perkins Coie LLP

(57) ABSTRACT

Technology for devices, systems, techniques and processes to provide anti-spoofing features for facial identification with enhanced security against facial spoofing devices or technique by using optical sensing and other sensing mechanisms to explore certain unique characteristics of a face of a live person that lack in most spoofing devices made of artificial materials or are difficult to replicate, including optical sensing based on unique optical absorption or reflection features of biological parts of a person's face.

32 Claims, 8 Drawing Sheets

(56) References Cited

U.S. PATENT DOCUMENTS

| | | | | |
|---|---|---|---|---|
| 2015/0199006 A1* | 7/2015 | He | ............... | G06F 3/013 |
| | | | | 345/158 |
| 2015/0205400 A1* | 7/2015 | Hwang | ............... | G06F 3/0488 |
| | | | | 345/654 |
| 2016/0056964 A1* | 2/2016 | Andiappan | ............... | G06F 21/602 |
| | | | | 713/189 |
| 2017/0337440 A1* | 11/2017 | Green | ............... | G06T 7/40 |
| 2018/0285668 A1* | 10/2018 | Li | ............... | G06K 9/6269 |
| 2020/0250403 A1* | 8/2020 | Xiao | ............... | G06K 9/00268 |
| 2020/0250448 A1* | 8/2020 | Joshi | ............... | G06K 9/00906 |

FOREIGN PATENT DOCUMENTS

| | | | |
|---|---|---|---|
| CN | 107180221 A | | 9/2017 |
| CN | 107644191 A | | 1/2018 |

* cited by examiner

11- Mobile platform
13- Display screen
15- Control button (e.g., volume)
17- Power button
19- Pressure or force sensor
21- Front camera and Face ID Imaging Module
23- Speaker(s)
27- Front optical Live Face sensor Strong retro reflection under 850nm illumination Weak retro reflection under 942nm illumination

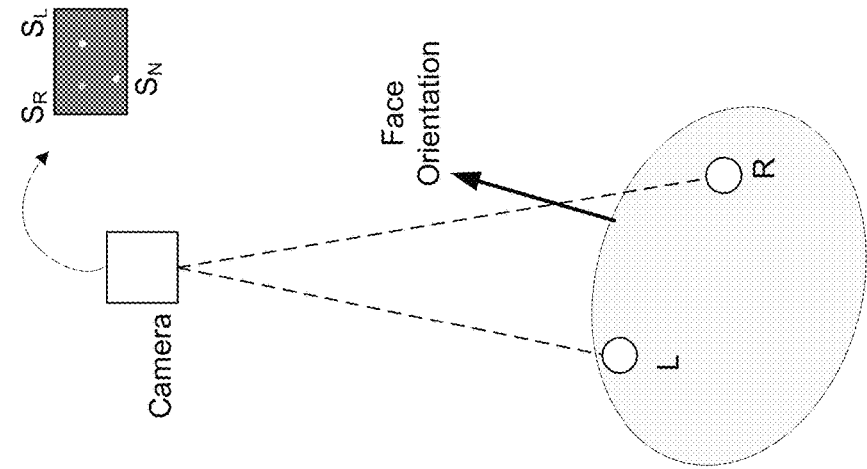
FIG. 7A
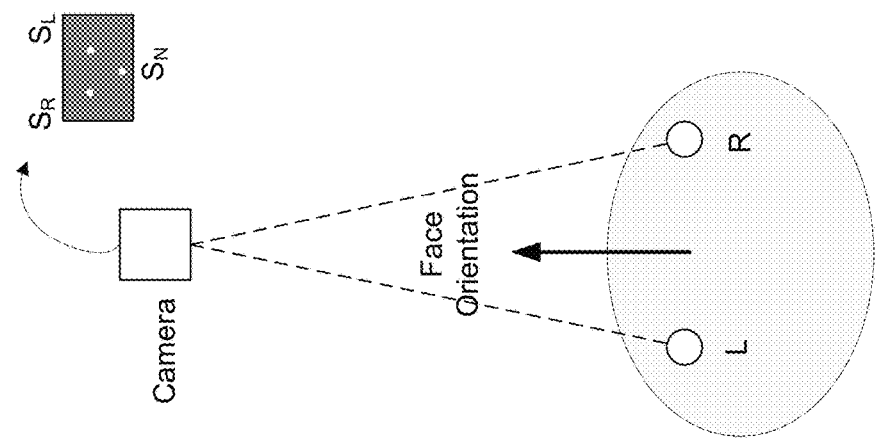
FIG. 7B
Legends
L - Left eye
R - Right eye
$S_R$ - Right eye image signal
$S_L$ - Left eye image signal
$S_N$ - Nose tip image signal
FIG. 7

ANTI-SPOOFING LIVE FACE SENSING FOR ENHANCING SECURITY OF FACIAL RECOGNITION

PRIORITY CLAIM AND RELATED PATENT APPLICATION

This patent document claims the benefits of and priority to U.S. Provisional Patent Application No. 62/788,749 entitled "ANTI-SPOOFING LIVE FACE SENSING FOR ENHANCING SECURITY OF FACIAL RECOGNITION" filed by Applicant Shenzhen Goodix Technology Co., Ltd. on Jan. 4, 2019, which is incorporated by reference as part of the disclosure of this patent document.

TECHNICAL FIELD

This patent document relates to detection of facial features of a person as part of user authentication for authorizing access to a secured electronic device, a secured digital system, a secured facility or premise.

BACKGROUND

Various sensors can be implemented in electronic devices or systems to detect unique identification features from or of persons and provide user authentication for grating or denying access to a secured device or system including portable or mobile computing devices (e.g., laptops, tablets, smartphones), gaming systems, various databases, information systems or larger computer-controlled systems. Various authentication mechanisms may be used to protect sensitive or confidential data and prevent unauthorized access. User authentication on an electronic device can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern. Another example is an imaging device that detects a person's face to extract the person's unique facial features as biometric identifier for user authentication. Some recent iPhone models from Apple Inc. are examples of devices that use facial imaging to provide face identification for authenticating whether a person is an authorized user.

However, a person's biometric identifier such as facial features may be replicated or fabricated by using a spoofing tool or device to evade the user authentication mechanism based on facial recognition.

SUMMARY

This patent document discloses devices, systems, techniques and processes to provide anti-spoofing features for facial identification with enhanced security against facial spoofing devices or technique by using optical sensing and other sensing mechanisms. The face of a live person processes certain unique characteristics that lack in most spoofing devices made of artificial materials or are difficult to replicate. The technology disclosed in this patent document uses such unique characteristics to provide anti-spoofing features for facial identification, including optical sensing based on unique optical absorption or reflection features of biological parts of a person's face.

In one aspect, the disclosed technology can be implemented to provide a system capable of preforming facial recognition to determine whether a person is an authorized user. This system can include, for example, a device structure on which an optical imaging system is located and includes an optical sensor array of optical detectors to capture one or more face images of a face of a person for facial recognition and one or more probe light sources on the device structure to produce probe light at two or more different optical illumination wavelengths to illuminate the face of the person. The one or more probe light sources are structured so that the two or more different optical illumination wavelengths of the probe light cause different levels of optical absorption by one or more parts of a face of a live person to produce different optical signals at the two or more different optical illumination wavelengths, respectively, that are measurably different at the optical probe detection module to indicate whether the detected face is from a live person rather than a spoofing device for evading the facial recognition. This system includes an optical probe light detection module located on the device structure, separate from the optical sensor array of the optical imaging system, to detect light on the face of the person caused by illumination of the probe light at the two or more different optical illumination wavelengths to produce a probe detection signal; and a device control module coupled to receive information in the probe detection signal from the optical probe light detection module and the captured one or more face images from the optical imaging system, the device control module structured to process the captured one or more face images to extract facial features of the person to compare the extracted facial features with digital data of known and existing facial features of an authorized user to determine whether there is a match as part of facial recognition. The device control module is structured and operable to process the detected light on the face of the person caused by illumination of the probe light to measure a difference in the detected light between two of the two or more different optical illumination wavelengths, and to apply the measured difference to determine whether the detected face is from a live person as an additional part of facial recognition.

In another aspect, the disclosed technology can be implemented to provide a method for performing facial recognition of a person to determine whether the person is an authorized user. One example of this method includes operating an optical imaging system that includes an optical sensor array of optical detectors to capture one or more face images of a face of a person; processing the captured one or more face images to extract facial features of the person to compare the extracted facial features with digital data of known and existing facial features of an authorized user to determine whether there is a match as part of facial recognition; directing probe light at two or more different optical illumination wavelengths to illuminate the face of the person; operating an optical probe light detection module, separate from the optical sensor array of the optical imaging system, to detect light on the face of the person caused by illumination of the probe light at the two or more different optical illumination wavelengths; processing the detected light on the face of the person caused by illumination of the probe light to measure a difference in the detected the detected light between two of the two or more different optical illumination wavelengths; and using the measured difference to determine whether the detected face is from a live person as an additional part of facial recognition.

In some implementations, the above method may include selecting the two or more different optical illumination wavelengths of the probe light so that the optical reflections from pupils of the person's eyes are measurably different in signal strength to allow the measured difference in the detected optical reflections from pupils of the person's eyes as an indicator for whether the detected face is from a live person. In other implementations, the above method ma include selecting the two or more different optical illumination wavelengths of the probe light to cause different levels of optical absorption by the facial skin of a live person so that beam spot sizes of the probe light that penetrates into the facial skin due and is scattered by the facial skin at the two or more different optical illumination wavelengths are measurably different; operating the probe detection module to capture images of the beam spots at the optical sensor array; processing the captured images of the beam spots at the two or more different optical illumination wavelengths to measure a difference in the beam spots; and using the measured difference to determine whether the detected face is from a live person as an additional part of facial recognition.

The above method may also include, in some implementations, placing two or more probe light sources adjacent to the optical sensor array so as to direct the probe light at the two or more different optical illumination wavelengths to the face of the person to cause near retro reflections from the person's eyes towards the probe light detection module when the person looks towards the probe light detection module.

The above method may also include, in some implementations, making the probe light directed towards the person to be polarized light in a first polarization; operating the probe light detection module to detect light at a second polarization in detecting reflected probe light from the pupils of the person's eyes; and using a power level of the detected reflected probe light in the particular polarization as an indicator of whether the reflected probe light is produced by reflection from a person's eye which depolarizes light when reflecting light or from an artificial object.

In yet another aspect, the disclosed technology can be implemented to provide a device for assisting facial recognition of a person to determine whether the person is a live user. This device includes an optical probe detection module that includes an optical probe sensor array of optical probe detectors to detect light from or capture images of a face of a person to assist facial recognition; and one or more probe light sources located near the optical probe sensor array to produce probe light at two or more different optical illumination wavelengths to illuminate the face of the person. The one or more probe light sources are structured so that the two or more different optical illumination wavelengths of the probe light cause different levels of optical absorption by one or more parts of a face of a live person to produce different optical signals at the two or more different optical illumination wavelengths, respectively, that are measurably different at the optical probe detection module to indicate whether the detected face is from a live person rather than a spoofing device for evading the facial recognition. In some implementations, this device can include one or more optical polarizers respectively placed in optical paths of the one or more probe light sources to produce the probe light directed towards the person to be polarized light in a first polarization; and one or more detection optical polarizers located to select only light in incident light to the optical probe sensor array at a second polarization to reach the optical probe sensor array to detector a power level of the received light at the second polarization as an indicator of whether the detected light is produced by reflection from a person's eye which depolarizes light when reflecting light or from an artificial object.

In some implementations of the above device, the one or more probe light sources may be structured to set (1) one of the two or more different optical illumination wavelengths of the probe light to be at or near 942 nm at which a live person's vitreous humor in the pupil or facial skin exhibits strong optical absorption and (2) another of the two or more different optical illumination wavelengths of the probe light to be spectrally positioned away from 942 nm at a selected optical illumination wavelength at which a live person's vitreous humor in the pupil or facial skin exhibits a measurably less optical absorption.

In some implementations of the above device, the device may further include one or more optical polarizers respectively placed in optical paths of the one or more probe light sources to produce the probe light directed towards the person to be polarized light in a first polarization; and one or more detection optical polarizers located to select only light in incident light to the optical probe sensor array at a second polarization to reach the optical probe sensor array to detector a power level of the received light at the second polarization as an indicator of whether the detected light is produced by reflection from a person's eye which depolarizes light when reflecting light or from an artificial object.

In some implementations of the above mentioned system, method or device, a triggering mechanism or module may be implemented to trigger, turn on, activate or initiate the face ID detection and processing when it is determined that a user intends to access a device. One trigger technique is to use one or more pressure sensors on the mobile device to sense whether a user is holding or grabbing a phone. Another example for this trigger mechanism is to use an acceleration sensor. Yet another example for such a trigger mechanism is an optical trigger by monitoring the user's eyes.

The drawings, the description and the claims below provide a more detailed description of the above and other aspects, their implementations and features of the disclosed technology.

BRIEF DESCRIPTION OF THE DRAWINGS

In FIG. 3, the following legends are used:

29—Connector;
31—Circuit board;
33—Micro camera driving board;
35—Micro camera;
35a—Filters;
35b—Polarizer;
35c—Photo diode array;
37—Light source No. 1;
37a—Light emitter No. 1;
37b—Light handler No. 1;
39—Light source No. 2;
39a—Light emitter No. 2;
39b—Light handler No. 2;
41—Camera lens assembly;
41a—Lens;
43—Window material No. 1;
45—Proximity light source;
45a—Proximity light emitter;
45b—Proximity light handler; and
47—Window material No. 2.

Figure 4:
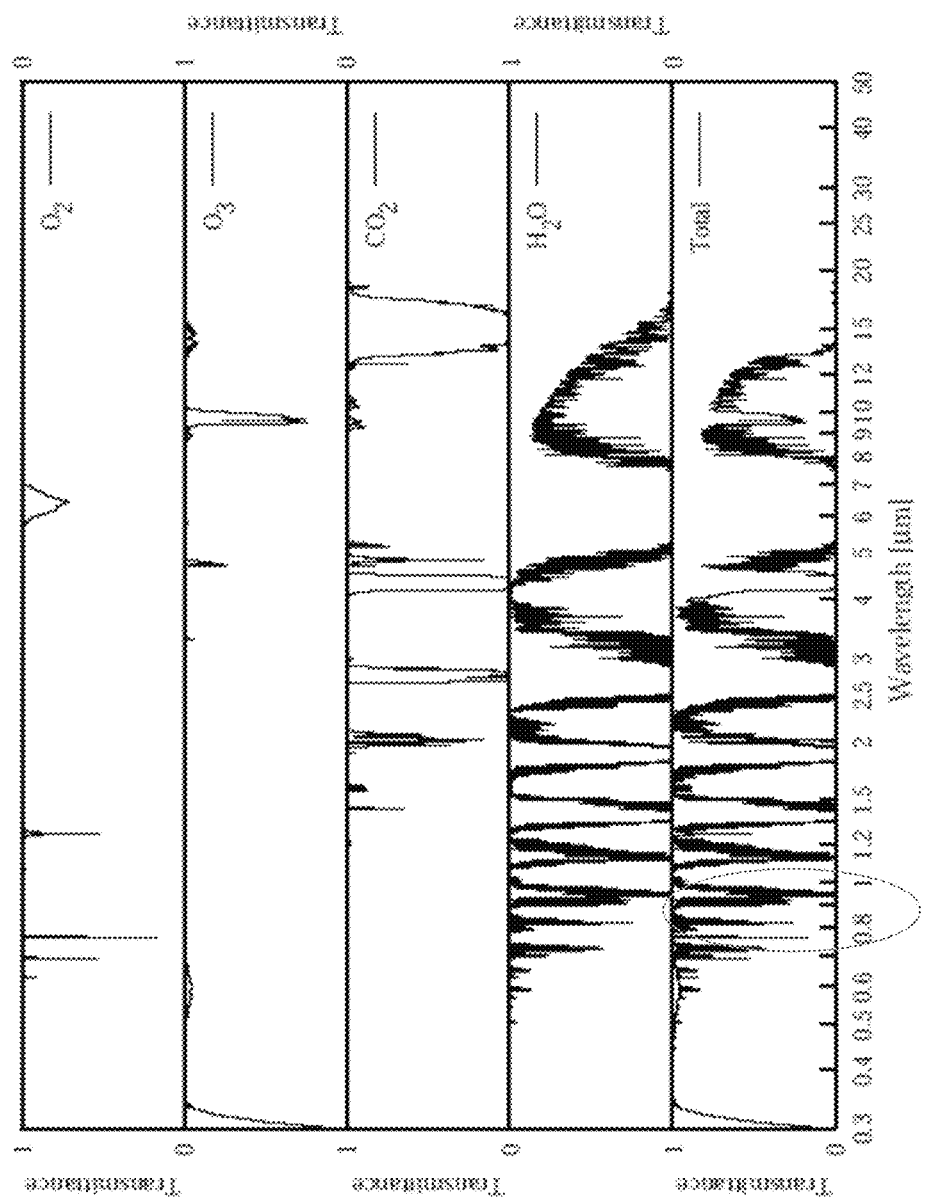
Figure 4:
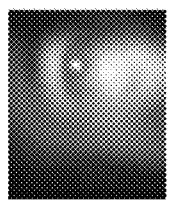
Figure 4:
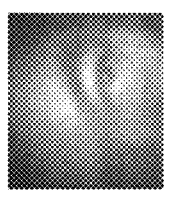

FIG. 4 shows examples of optical absorption properties of water and other substances and two reflection images from a live person's eye at the 942 nm and 850 nm, respectively.

Figure 5:
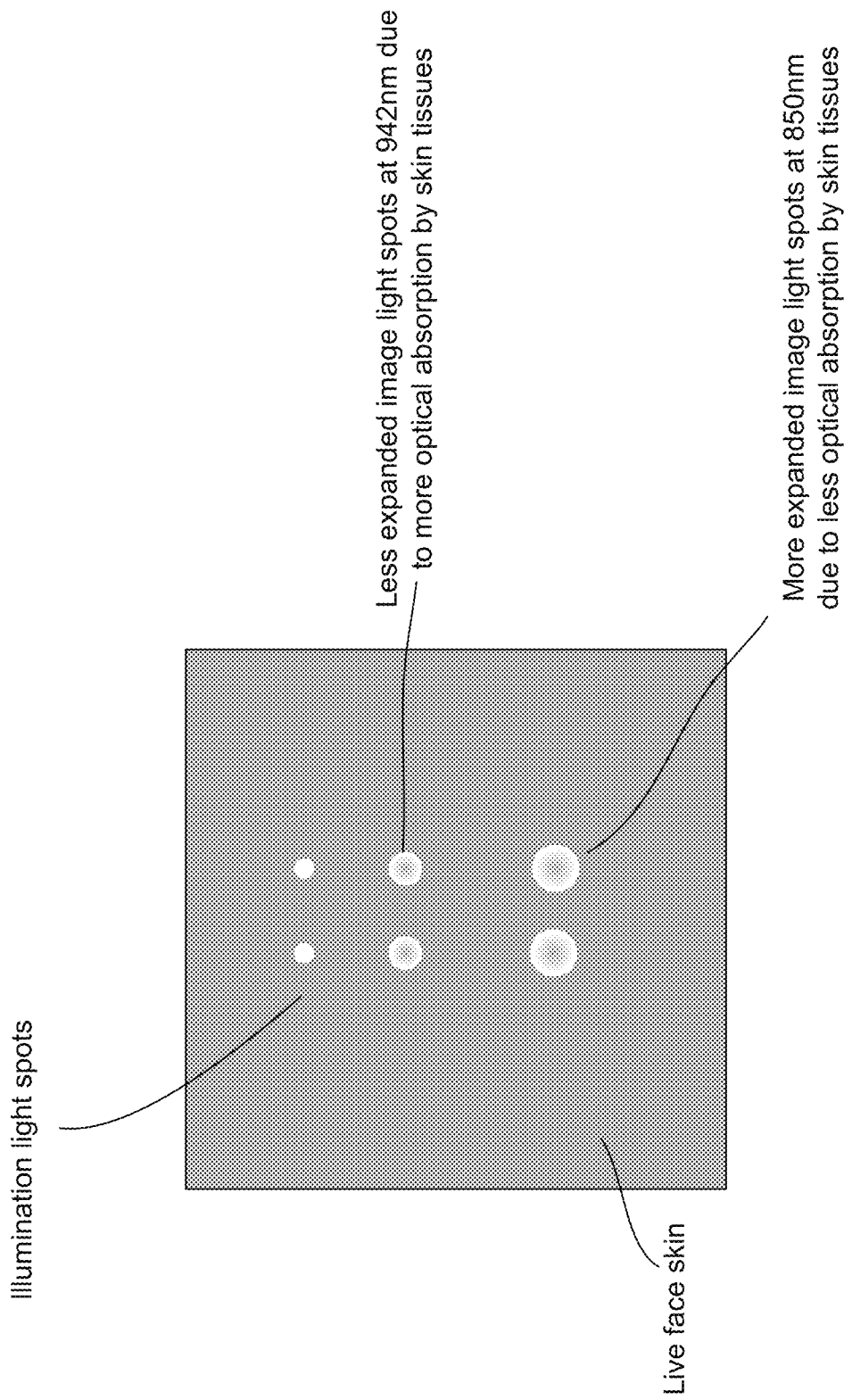

FIG. 5 shows an illustration of beam expansion for infrared probe light that enters into the skin and is scattered by the skin tissues at 942 nm and 850 nm.

Figure 6:
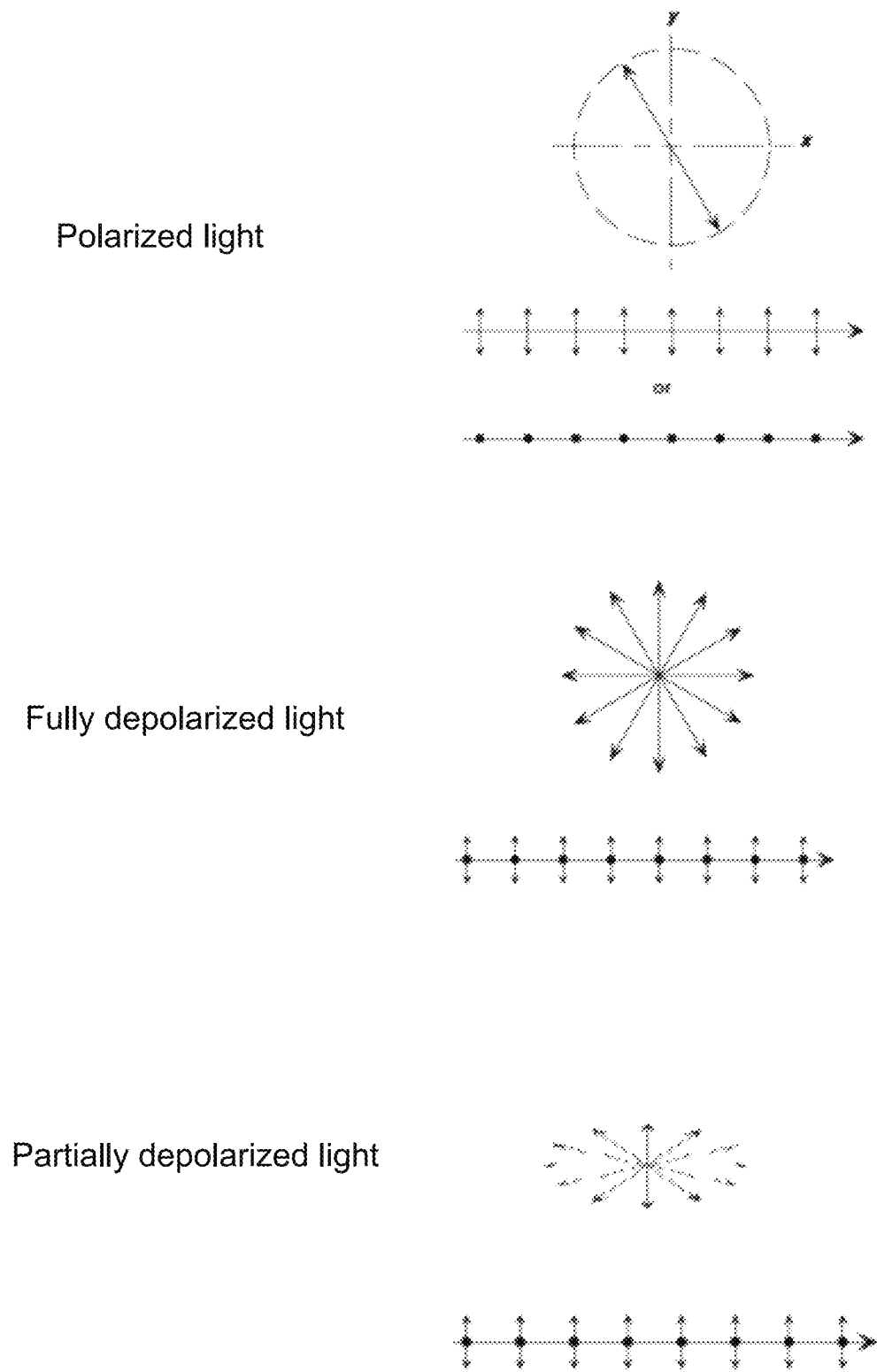

FIG. 6 illustrates the use of light polarization in connection with the depolarizing property of the human's retina in reflecting polarized light.

FIG. 7 illustrates an optical detection of the face orientation of a face based on image locations of certain facial parts on a face of a person.

Figure 8:
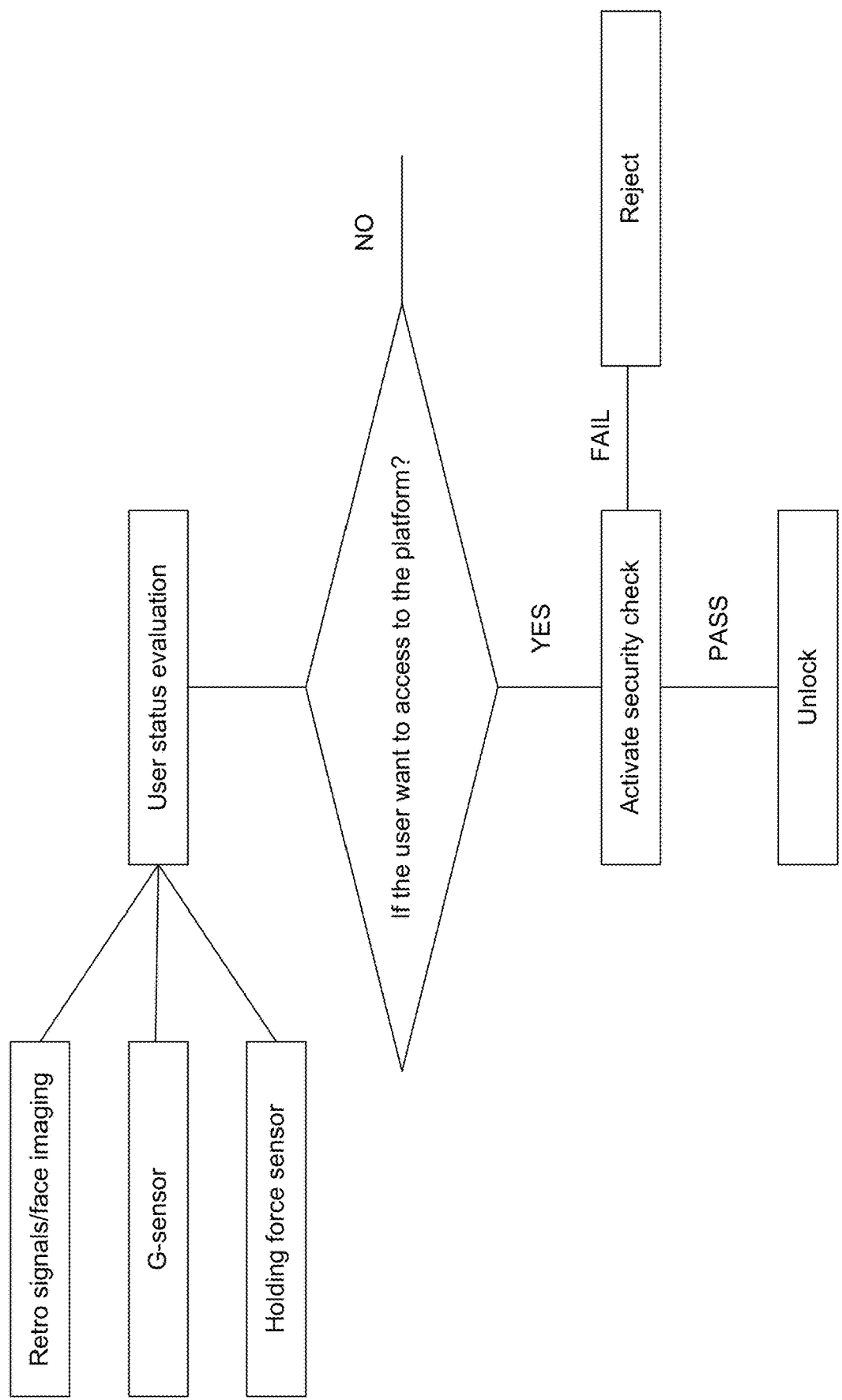

FIG. 8 shows an example of the live face detection algorithm based on the disclosed optical live face detection in this patent document.

DETAILED DESCRIPTION

The face identification technology disclosed in this patent document provides optical sensing of unique characteristics of a person's face in interacting with light to provide anti-spoofing features for facial identification. Electronic devices or systems may be equipped with the disclosed face identification mechanisms to improve the security for accessing the devices or systems. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Figure 1:
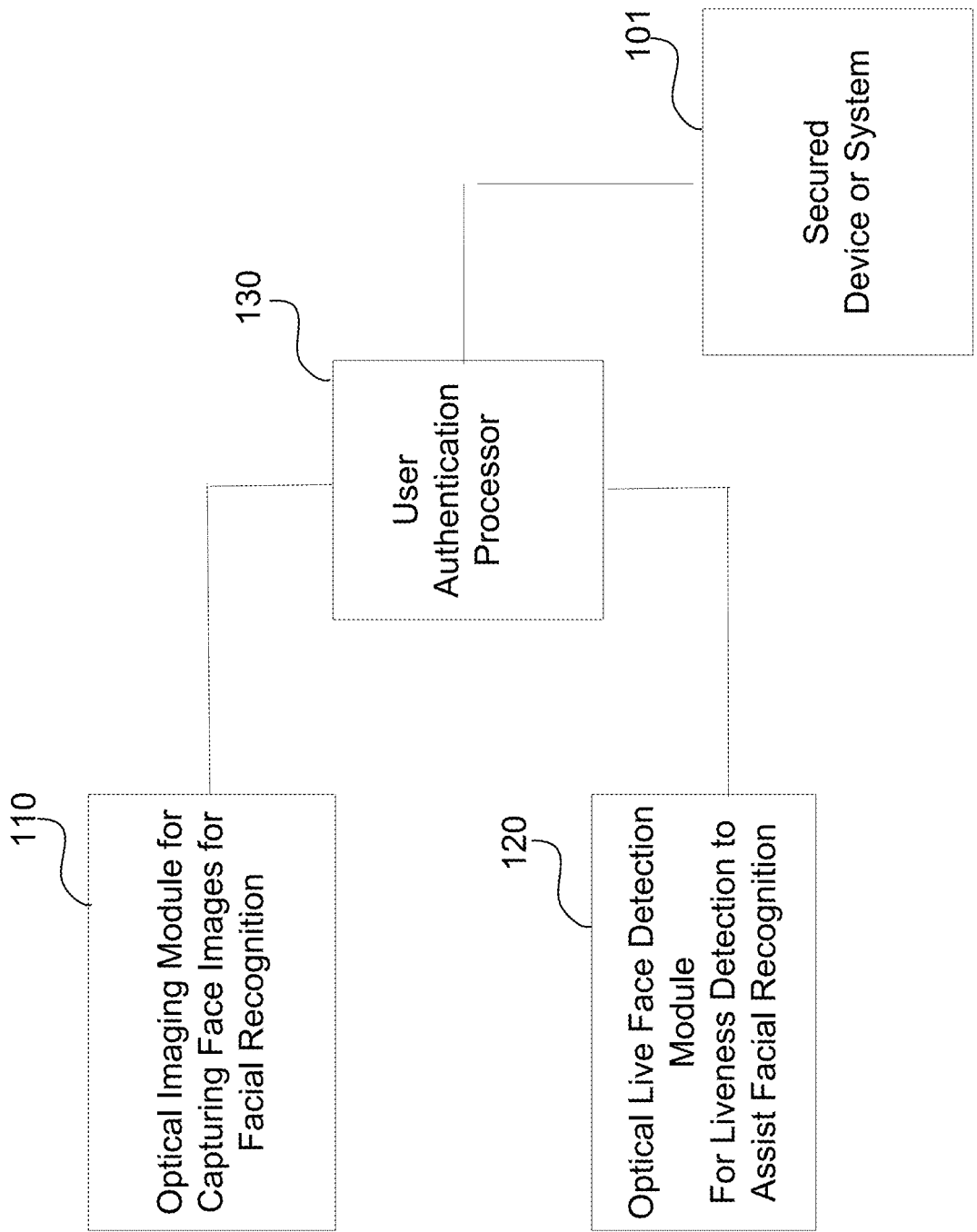
FIG. 1 is a block diagram of an example of a secured device or system having a face recognition for user authentication by including an optical imaging module for capturing images of a face for face recognition, an optical liveness detection module to determine whether the object from which face images are captured is a face of a live person, and a user authentication processor that determines whether to grant or deny the access based on the information from the two modules for the face recognition.

FIG. 1 is a block diagram of an example of a secured device or system having a face recognition for user authentication by including (1) an optical imaging module 110 for capturing images of a face for face recognition, (2) an optical liveness detection module 120 for performing optical sensing of one or more optical characteristics of the object from which face images are captured by the optical imaging module 110, and (3) a user authentication processor 130 that determines whether to grant or deny the access to a secured device or system 101 based on the information from the two modules 110 and 120 for the face recognition. The user authentication processor 130 is in communication with the two optical sensing modules 110 and 120 to receive their output signals or data and to process such received signals or data to determine, based on both the face images from the optical imaging module 110 and the liveness detection from the optical liveness detection module 120, whether the object from which face images are captured is a face of a live person. In this example, the optical imaging module 110 for face recognition may be implemented in various configurations, for example, the optical face ID system used in some recent iPhone models by Apple Inc. Such an optical imaging module 110 for face recognition includes one or more high-resolution cameras to capture detailed images of a face in order to extract facial features for face ID. In some implementations, this optical imaging module 110 for face recognition may include imaging hardware for capturing 2D images in some designs and may also include imaging hardware for capturing 3D images in other designs. The images of the face from the optical imaging module 110 are sent in form of digital imaging data to the user authentication processor 130 for processing. The user authentication processor 130 is programed to perform face recognition operations, including extraction of facial features from the images obtained at the optical imaging module 110 and conduct computational operations to compare the extracted facial features of the person to known and existing facial features of an authorized user to determine whether there is a match. The known and existing facial features of an authorized user are stored, usually in a local memory in the device or system and may also be stored in a connected server in the network or cloud. In some facial recognition systems, the access is granted when there is a match. Under the disclosed technology in this patent document, an additional sensing is performed to determine whether the object under the detection that exhibits the matched facial features is a face of a live person by operations of the optical liveness detection module 120 and by further processing carried out in the user authentication processor 130.

The optical liveness detection module 120 is to optically probe the presumed face or object that is presented to the device by optically detecting or measuring one or more optical parameters or characteristics of the presumed face or object for determining whether the presumed face or object is a face of a real person. In some implementations, this can be achieved by directing probe light at two or more different optical illumination wavelengths to illuminate the face and to use a designated optical probe light detection module, separate from the one or more optical sensor arrays of the optical imaging module 110, to detect light on the face of the person caused by illumination of the probe light at the two or more different optical illumination wavelengths. This probe detection can be designed in the hardware of the optical liveness detection module 120 to measure certain optical properties of the reflected or scattered light by the face due to the probe illumination, where the certain optical properties are associated with unique properties that are exhibited by a face of a live person and lack in artificial materials or structures often used in spoofing devices such as a fake face mask. The optical liveness detection module 120 can, in some implementations, include at least one optical sensor array that is capable of capturing images of the face but the captures images are processed for live face detection or for detection of the face orientation to assist the face ID authentication. As such, this optical liveness detection module 120 is, in this example, an additional feature added to the face ID mechanism to enhance the security of the face ID authentication. In practical applications, the disclosed optical live face detection can be used for different face ID authentication systems.

In operation, the optical measurements for live face obtained by the optical liveness detection module 120 are sent to the user authentication processor 130 which is further programed to process the detected light on the face of the person caused by illumination of the probe light to measure a difference in the detected the detected light between two of the two or more different optical illumination wavelengths and to use the measured difference to determine whether the detected face is from a live person as an additional part of facial recognition. Two specific examples of optical properties associated with the human face skin and the human eyes are provided below to illustrate the operation and function of the optical liveness detection module 120.

In practical applications, the above face recognition system having modules 110, 120 and 130 can be coupled to a device or system 101 as shown in FIG. 1 to protect the access and limit the access only to one or more authorized users. The device or system 101 that can benefit from such face recognition system can be a wide range of different devices or systems, including, for example, smartphones, tablet computers, wrist-worn devices and other wearable or portable devices, portable or mobile computing devices, larger electronic devices or systems, personal computers in portable forms or desktop forms, ATMs, various terminals to various electronic systems, databases, or information systems for commercial or governmental uses, motorized transportation systems including automobiles, boats, trains, aircraft and others. In an automobile equipped with such a face recognition system, the two optical modules 110 and 120 may be installed near an entrance of the automobile such as each of the access doors for the driver or a passenger (including, in some vehicles, the access opening at the back of a vehicle such as the rear door or hatch of an SUV).

Figure 2:
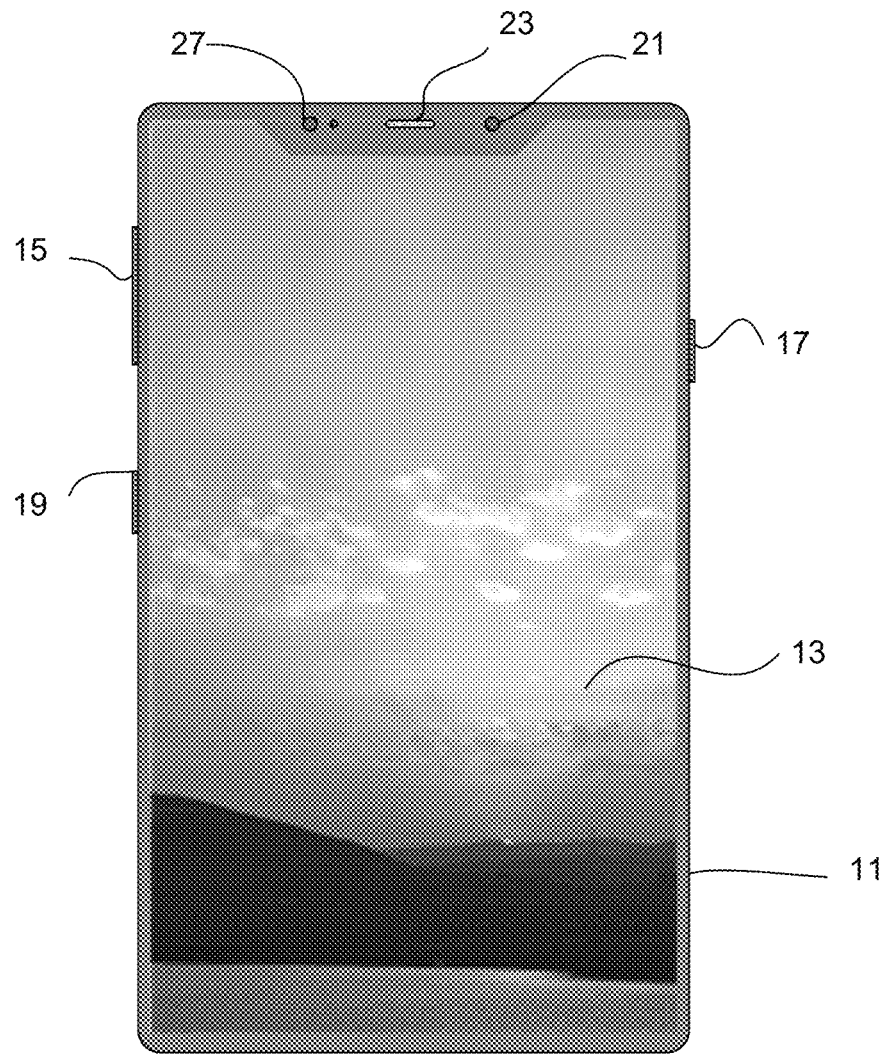
FIG. 2 shows an example of the frontal facet of a mobile phone that implements the optical live face detection in FIG. 1.

FIG. 2 shows an example of the frontal facet of a mobile phone 11 that implements the optical live face detection in FIG. 1. This mobile phone 11 includes a front camera and a face ID imaging module labeled as "21" on the upper right-hand side of the front face. This module 21 includes the optical imaging module 110 in FIG. 1. The front optical live face sensor 27 on the upper left-hand side of the front face is the optical liveness detection module 120 in FIG. 1. There are other sensors shown in FIG. 2, including a pressure or force sensor 19 illustrated as being located on a side of the mobile phone 11. In some implementations, one or more such pressure or force sensors may be used to detect whether a user is grabbing or holding the phone and such sensors are used as a trigger to turn on or activate the face ID operation shown in FIG. 1. Pressure or force sensors are specific examples of such a face ID trigger or activation mechanism, and other examples include proximity sensors or motion sensors in some designs.

Figure 3:
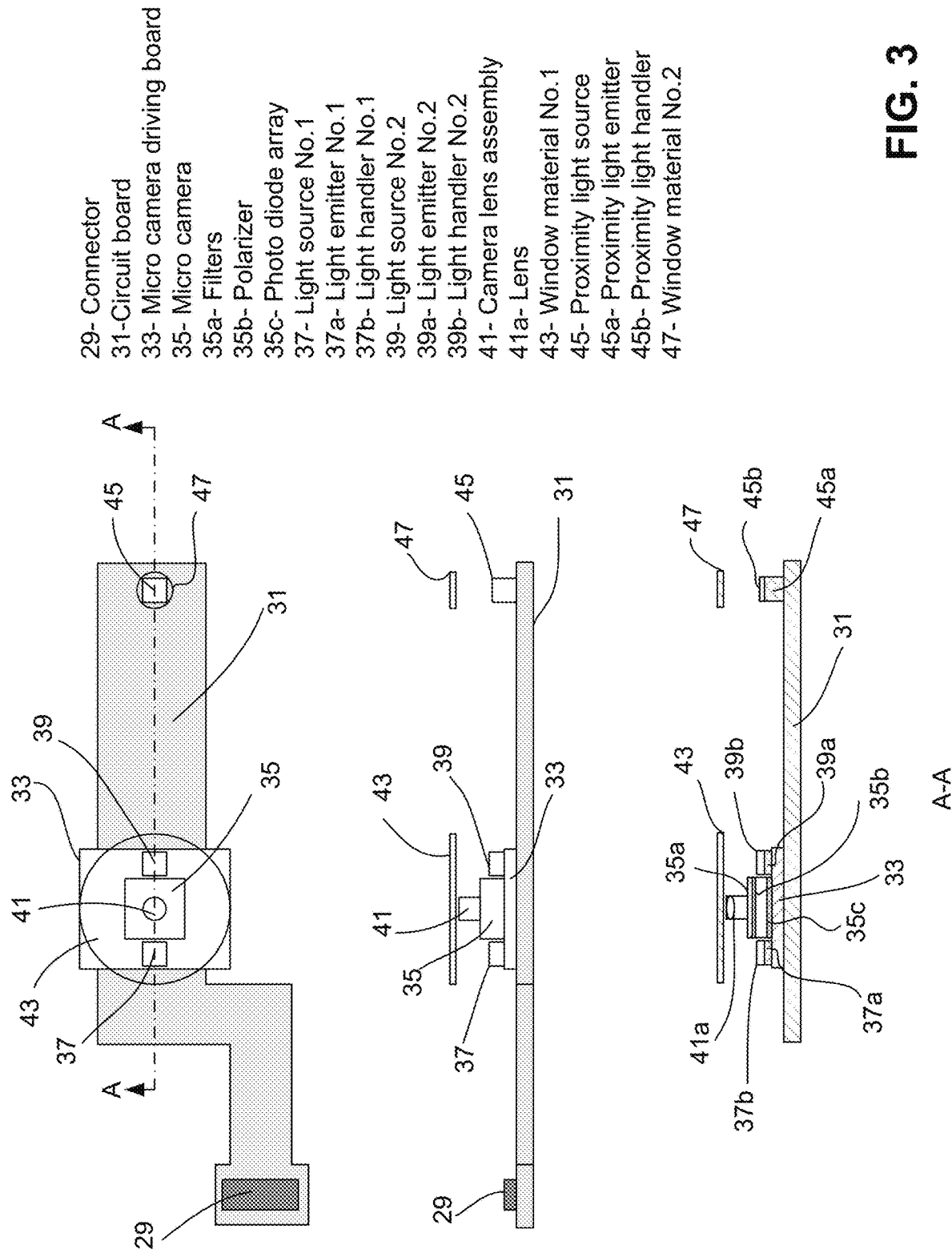
FIG. 3 shows an example of an optical live face detection module package with an optical probe detection array and one or more probe light sources for generating probe light at two or more different optical illumination wavelengths to cause different levels of optical absorption by one or more parts of a face of a live person to produce different optical signals that are measurably different to indicate whether the detected face is from a live person rather than a spoofing device for evading the facial recognition.

FIG. 3 shows an example of an optical live face detection module package with an optical probe detection array and one or more probe light sources for generating probe light at two or more different optical illumination wavelengths to cause different levels of optical absorption by one or more parts of a face of a live person to produce different optical signals that are measurably different to indicate whether the detected face is from a live person rather than a spoofing device for evading the facial recognition. This is an example implementation of the optical live face detection module 120 in FIG. 1. In this example, a micro IR camera 35 and probe light sources 37 and 39 are assembled onto a circuit board 31. The micro IR camera 35 includes an optical sensor array of IR optical sensors for optical detection and the probe light sources 37 and 39 are used to generate the different illumination probe light at different optical wavelengths that are specially selected for detecting whether the object is a face of a live person. A connector 29 connects the whole package with the mobile phone platform. This design allows the optical live face detection module package to be integrated with different mobile phone platforms or different devices or systems that use optical face ID authentication.

Specifically, in the illustrated example in FIG. 3, the micro IR camera 35 includes a lens or lens assembly 41*a*, optical filters 35*a*, an optical polarizer 35*b*, an optical sensor array 35*c* which may a photo diode array of IR sensing diodes. The probe light sources 37, 39, and proximity light source 45 are designed to co-operate with the micro IR camera 35. In the light sources, light handlers 37*b*, 39*b*, and 45*b* are provided so that the light beam divergence angle and polarization properties etc. are treated for the functions. The probe light can be of a linear polarization or a rotating polarization such as a circular polarization. The light handlers may include a linear polarizer, a wave-plate, and a liquid crystal or optical birefringent crystal materials so as to control the light polarization properties. The light handler may also include a diffraction optical element (DOE) to form light spots in proper positions.

The example in FIG. 3 also shows that a micro driving board 33 is applied to run the micro camera and the probe light sources. In this example, the probe light sources 37 and 39 are installed close to the micro camera's lens axis to get nearly retro reflection from a face looking at the mobile screen. The proximity light source 45 is installed away at a desired distance from the micro camera's lens axis and is used to provide optical sensing of a proximity of an object such as the distance of an eye to the camera.

FIG. 4 shows examples of optical absorption properties of water and other substances and two reflection images from a live person's eye at the 942 nm and 850 nm, respectively. When a probe light source such as 37 or 39 is placed close to the micro camera's lens axis, retro reflection phenomenon may appear when the camera captures images from human eyes if the eyes are looking directly at the camera. The reflection of light from the eye have an unique optical absorption signature at or near 942 nm and this property can be used for liveness detection.

FIG. 4 further shows that the optical absorption in water is strong at the 942 nm window, and is relatively weak at other wavelengths, such as the 850 nm window which is still in the IP spectral range. Approximately 98~99% of human eyeballs' vitreous humor is water, so the light at or near 942 nm is strongly absorbed and can hardly reach human eye's retina behind the vitreous humor. Based on this property, one or more probe light sources emitting light at or near 942 nm can be used as one of the retro light sources, and chooses other IR probe light sources at 850 nm or other IR wavelengths as the other retro light source for emitting IR probe light that is not strongly absorbed as the probe light at the 942 nm.

Because of the strong absorption at the 942 nm window in the spectral range, when the 942 nm light source is on, the human eyes' retro reflection is weak. However at other IR wavelengths away from the 942 nm, such as 850 nm, such IR light is not strongly absorbed by human eyeballs' vitreous humor and thus can reach the retina which reflects the light to produce a strong optical reflection. This reflection, once received by the IR camera, can produce a strong retro reflection image. Using the optical reflections at both 942 nm and another IR wavelength (e.g., 850 nm), the detected optical reflections at the two different IR wavelengths are different in signal strength based on the spectrum signature caused by the water. The measurements of such optical reflections can be evaluated to determine whether the retro signals are from live eyeballs, i.e., as an indicator of whether the object is an eye of a live person.

FIG. 5 shows an illustration of beam expansion for infrared probe light that enters into the skin and is scattered by the skin tissues at 942 nm and 850 nm. When light spots are projected onto a live face, partial of the light is scattered on the surface, and partial of the light is refracted into the surface. The refracted component is strongly scattered so that the light spot profile is expanded to a bigger size and shape. Due to the strong absorption of the face skin tissues (because of the water) at or near 942 nm, probe light at or near 942 nm is strongly attenuated once entering the skin and such the beam spots manifest a weak expansion. In contrast, due to the weak absorption of the face skin tissues at the probe light at 850 nm or another IR wavelength away from 942 nm, the probe light at the 850 nm (or other proper wavelength band) can produce light spots that manifest strong beam profile expansion after entering the face skin. The camera in the optical live face module can be used to capture such images and the captured images can be used to analyze the face liveness.

FIG. 6 illustrates an example for the use of light polarization in connection with the depolarizing property of the human's retina in reflecting polarized light in some implementations of the disclosed technology. This aspect of the disclosed technology is based on the recognition that human eyeball's light reflection can be simulated with a lens and a reflector in its focal plane and, notably, human eye retina strongly depolarizes the incident light and thus is a unique reflector. This unique property of the retina can be used for detecting whether an object is an eye of a live person.

Specifically, when a polarized light is incident into real live human eyes, the retro reflection contains large ratio (~80% or more) of depolarized component. A lens, even with a rough reflector in its focal plane, can hardly produce similar depolarization features. Accordingly, a polarizer, for example a linear polarizer, can be mounted onto each of the probe light sources in the optical live face detection module 110 in FIG. 1 to ensure that the probe light from each probe light source has a desired polarization. Based on this, a detection optical polarizer is mounted in the micro camera's light path to evaluate the depolarization of the returned light from the reflecting object. The retro light reflected from a real live eye is almost fully depolarized. The retro light reflected from a fake eye is either partially polarized or not depolarized. The polarization direction of the detection optical polarizer at the camera can be oriented to be perpendicular to the polarization of an optical polarizer at the probe light source. This can be used to detect the liveness of an object.

In addition, the depolarization properties of the face reflected light spots images can be analyzed in connection with the absorption properties discussed in connection with FIGS. 4 and 5 to further enhance the liveness detection because it is usually difficult to find fake face materials to have same depolarization properties at both light wavelength windows of the strong absorption 942 nm window and the 850 nm window. By analyzing the light spots expansion difference and depolarization properties between 942 nm band and other reference wavelength band, we can obtain criteria to tell if the face is live.

The processing of face ID is a computing intensive process and tends to drain the battery power. Various triggering mechanisms may be used to turn on, activate or initiate the face ID detection and processing when it is determined that a user intends to access a device such as the mobile phone.

One trigger technique is to use one or more pressure sensors on the mobile device to sense whether a user is holding or grabbing a phone. Referring to FIG. 2, one or more holding force sensors or pressure sensors 19 may be integrated in the frame of the mobile platform. Such a sensor can either be seen like shown marked 19, or totally hidden in the frame so that it is invisible.

Another example for this trigger mechanism is to use a G-sensor (or acceleration sensor) in the mobile device or phone to sense the movement of the platform, such as a smartphone. Almost all smartphones have G-sensor integrated in the system and the sensor output can be used to trigger the face ID detection and processing.

Yet another example for such a trigger mechanism is an optical trigger by monitoring the user's eyes. When the optical sensor detects that the user's eyes are looking at the platform, such as a smartphone, the security sensor, for example, a face ID sensor or a fingerprint sensor is activated. In this regard, the probe light detection module, which can be part of the optical live detection module 120 in FIG. 1, is used to capture one or more face images to identify image locations of landmark features on the face of the person and the user authentication process 130 processes the identified image locations of landmark features on the face of the person to determine whether the person is looking towards the probe light detection module.

FIG. 7 illustrates an example of an optical detection of the face orientation of a face based on image locations of certain facial parts on a face of a person. When a person is staring at the face ID camera, in the image, the eyes' images and other face parts (e.g. nose tip, lower jaw etc.) images positions are normally symmetric, as shown in above left figure in FIG. 7A. When a person is facing other directions, in the image, the eyes' images and other face parts (e.g. nose tip) image positions are not symmetric in the captured image by the face ID camera, as shown in above right figure in FIG. 7B. Based on the image analysis, the face ID sensor can tell if the user is looking at platform.

FIG. 8 shows an example of the live face detection algorithm based on the disclosed optical live face detection in this patent document. This process first detects the user status based on one or more triggering signals such as the user face orientation relative to the phone screen, the movement and the holding force of a user's hand. If this detection generates a trigger, the face ID hardware is turned on to perform the optical face ID sensing and the processing for the face ID authentication. Only if both the face feature match and the live face detection are successful, the system grants the access. This use of a combination of both the face feature match and the live face detection can reduce the success of face spoofing attempts and thus enhance the security level of the face ID authentication.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for performing facial recognition of a person to determine whether the person is an authorized user, comprising:
    operating an optical imaging system that includes an optical sensor array of optical detectors to capture one or more face images of a face of a person;
    processing the captured one or more face images to extract facial features of the person to compare the extracted facial features with digital data of known and existing facial features of an authorized user to determine whether there is a match as part of facial recognition;
    directing probe light at two or more different optical illumination wavelengths to illuminate the face of the person;
    operating an optical probe light detection module, separate from the optical sensor array of the optical imaging system, to detect light on the face of the person caused by illumination of the probe light at the two or more different optical illumination wavelengths;
    processing the detected light on the face of the person caused by illumination of the probe light to measure a difference in the detected the detected light between two of the two or more different optical illumination wavelengths; and
    using the measured difference to determine whether the detected face is from a live person as an additional part of facial recognition, wherein
        prior to initiating facial recognition,
            operating the optical probe light detection module to capture one or more face images to identify image locations of landmark features on the face of the person,
            processing the identified image locations of landmark features on the face of the person to determine whether the person is looking towards the probe light detection module, and
            initiating, after it is determined that the person is looking towards the probe light detection module, the facial recognition to determine whether there is a match between the extracted facial features and known and existing facial features of an authorized user and determination of whether the detected face is from a live person based on the measured difference in the detected optical reflections at the two or more different optical illumination wavelengths.

2. The method as in claim 1, wherein:
    selecting the two or more different optical illumination wavelengths of the probe light so that the optical reflections from pupils of the person's eyes are measurably different in signal strength to allow the measured difference in the detected optical reflections from pupils of the person's eyes as an indicator for whether the detected face is from a live person.

3. The method as in claim 1, wherein:
    selecting the two or more different optical illumination wavelengths of the probe light to cause different levels of optical absorption by the facial skin of a live person so that beam spot sizes of the probe light that penetrates into the facial skin due and is scattered by the facial skin at the two or more different optical illumination wavelengths are measurably different;
    operating the probe detection module to capture images of the beam spots at the optical sensor array;
    processing the captured images of the beam spots at the two or more different optical illumination wavelengths to measure a difference in the beam spots; and
    using the measured difference to determine whether the detected face is from a live person as an additional part of facial recognition.

4. The method as in claim 1, wherein:
    one of the two or more different optical illumination wavelengths of the probe light has a wavelength of 942 nm at which a live person's vitreous humor in the pupil or facial skin exhibits strong optical absorption; and
    another of the two or more different optical illumination wavelengths of the probe light is spectrally positioned away from 942 nm at a selected optical illumination wavelength at which a live person's vitreous humor in the pupil or facial skin exhibits a measurably less optical absorption.

5. The method as in claim 4, wherein:
    the selected optical illumination wavelength of the other of the two or more different optical illumination wavelengths of the probe light spectrally positioned away from 942 nm at 850 nm.

6. The method as in claim 1, further comprising:
    placing two or more probe light sources adjacent to the optical sensor array so as to direct the probe light at the two or more different optical illumination wavelengths to the face of the person to cause retro reflections from the person's eyes towards the probe light detection module when the person looks towards the probe light detection module.

7. The method as in claim 1, further comprising:
    making the probe light directed towards the person to be polarized light in a first polarization;
    operating the probe light detection module to detect light at a second polarization in detecting reflected probe light from the pupils of the person's eyes; and
    using a power level of the detected reflected probe light in the particular polarization as an indicator of whether the reflected probe light is produced by reflection from a person's eye which depolarizes light when reflecting light or from an artificial object.

8. The method as in claim 7, wherein the second polarization is orthogonal to the first polarization.

9. The method as in claim 8, wherein the first and second polarizations are linear polarizations that are orthogonal to each other.

10. The method as in claim 8, wherein the first and second polarizations are circular polarizations that are orthogonal to each other.

11. The method as in claim 1, wherein:
the probe detection module includes an infrared optical sensor array of infrared optical detectors structured to detect light in an infrared spectral range.

12. The method as in claim 11, wherein:
the probe detection module includes:
a first infrared optical sensor array of infrared optical detectors structured to detect light at a first optical illumination wavelength; and
a second, separate infrared optical sensor array of infrared optical detectors structured to detect light at a second, different optical illumination wavelength.

13. The method as in claim 1, wherein:
the image locations of the landmark features on the face of the person include image locations of eyes and image location of the nose or mouth,
the processing of the identified image locations of landmark features on the face of the person includes evaluating relative image locations of eyes with respect to the nose or mouth.

14. The method as in claim 1, comprising:
prior to initiating facial recognition,
operating one or more pressure sensors placed on a hand-held device on which the optical imaging system and the probe detection module are located to measure one or more forces exerted upon the one or more pressure sensors as an indicator of whether the person is holding the hand-held device,
processing the measured one or more forces to produce an affirmative signal indicating whether the person is holding the hand-held device, and
initiating, after it is affirmative that the person is holding the hand-held device, the facial recognition to determine whether there is a match between the extracted facial features and known and existing facial features of an authorized user and determination of whether the detected face is from a live person based on the measured difference in the detected optical reflections at the two or more different optical illumination wavelengths.

15. The method as in claim 1, comprising:
prior to initiating facial recognition,
operating an accelerometer placed on a hand-held device on which the optical imaging system and the optical probe detection module are located to measure a status of movement of the hand-held device, and
initiating, after the measured status from the accelerometer indicates that the person is moving the hand-held device, the facial recognition to determine whether there is a match between the extracted facial features and known and existing facial features of an authorized user and determination of whether the detected face is from a live person based on the measured difference in the detected optical reflections at the two or more different optical illumination wavelengths.

16. A device for assisting facial recognition of a person to determine whether the person is a live user, comprising:
an optical probe light detection module that includes an optical probe sensor array of optical probe detectors to detect light from or capture one or more face images of a face of a person to assist facial recognition; and
one or more probe light sources located near the optical probe sensor array to produce probe light at two or more different optical illumination wavelengths to illuminate the face of the person, wherein the one or more probe light sources are structured so that the two or more different optical illumination wavelengths of the probe light cause different levels of optical absorption by one or more parts of a face of a live person to produce different optical signals at the two or more different optical illumination wavelengths, respectively, that are measurably different at the optical probe detection module to indicate whether the detected face is from a live person rather than a spoofing device for evading the facial recognition,
wherein the optical probe light detection module is structured to
capture the one or more face images to identify image locations of landmark features on the face of the person and extract facial features,
processe the identified image locations of the landmark features on the face of the person to determine whether the person is looking towards the optical probe light detection module,
wherein the identified image locations of the landmark features on the face of the person include image locations of eyes and of the nose or mouth, and
wherein the processing of the identified image locations of landmark features on the face of the person includes evaluating relative image locations of the eyes with respect to the nose or mouth.

17. The device as in claim 16, wherein:
the one or more probe light sources are structured to set (1) one of the two or more different optical illumination wavelengths of the probe light has a wavelength of 942 nm at which a live person's vitreous humor in the pupil or facial skin exhibits strong optical absorption and (2) another of the two or more different optical illumination wavelengths of the probe light to be spectrally positioned away from 942 nm at a selected optical illumination wavelength at which a live person's vitreous humor in the pupil or facial skin exhibits a measurably less optical absorption.

18. The device as in claim 16, comprising:
one or more optical polarizers respectively placed in optical paths of the one or more probe light sources to produce the probe light directed towards the person to be polarized light in a first polarization; and
one or more detection optical polarizers located to select only light in incident light to the optical probe sensor array at a second polarization to reach the optical probe sensor array to detector a power level of the received light at the second polarization as an indicator of whether the detected light is produced by reflection from a person's eye which depolarizes light when reflecting light or from an artificial object.

19. The device as in claim 18, wherein the second polarization is orthogonal to the first polarization.

20. A system capable of preforming facial recognition to determine whether a person is an authorized user, comprising:
a device structure on which an optical imaging system is located and includes an optical sensor array of optical detectors to capture one or more face images of a face of a person for facial recognition;
one or more probe light sources on the device structure to produce probe light at two or more different optical illumination wavelengths to illuminate the face of the person, wherein the one or more probe light sources are structured so that the two or more different optical illumination wavelengths of the probe light cause different levels of optical absorption by one or more parts of a face of a live person to produce different optical signals at the two or more different optical illumination wavelengths, respectively, that are measurably different at the optical probe detection module to indicate whether the detected face is from the live person rather than a spoofing device for evading the facial recognition;

an optical probe light detection module located on the device structure, separate from the optical sensor array of the optical imaging system, to detect light on the face of the person caused by illumination of the probe light at the two or more different optical illumination wavelengths to produce a probe detection signal; and a device control module coupled to receive information in the probe detection signal from the optical probe light detection module and the captured one or more face images from the optical imaging system, the device control module structured to process the captured one or more face images to extract facial features of the person to compare the extracted facial features with digital data of known and existing facial features of an authorized user to determine whether there is a match as part of facial recognition, the device control module structured and operable to process the detected light on the face of the person caused by illumination of the probe light to measure a difference in the detected light between two of the two or more different optical illumination wavelengths, and to apply the measured difference to determine whether the detected face is from the live person as an additional part of facial recognition, wherein prior to initiating facial recognition, the device control module
- identifies image locations of landmark features on the face of the person,
- processes the identified image locations of landmark features on the face of the person to determine whether the person is looking towards the probe light detection module, and
- initiates, after it is determined that the person is looking towards the optical probe light detection module, the facial recognition to further determine whether there is a match between the extracted facial features and the known and existing facial features of the authorized user and determine whether the detected face is from the live person.

21. The system as in claim 20, wherein:
the device structure is part of a mobile device and is structured so that the optical imaging system and the optical probe detection module are placed to face a user when a user look at a display screen of the mobile device.

22. The system as in claim 21, comprising:
one or more pressure sensors on the device structure of the mobile phone operable to measure one or more forces exerted upon the one or more pressure sensors as an indicator of whether the person is holding the mobile device; and
the device control module is operable to, prior to initiating facial recognition, process the measured one or more forces to produce an affirmative signal indicating whether the person is holding the mobile device, and initiate, after it is affirmative that the person is holding the mobile device, the facial recognition to determine whether there is a match between the extracted facial features and known and existing facial features of an authorized user and determination of whether the detected face is from a live person based on the difference in the detected light between two of the two or more different optical illumination wavelengths.

23. The system as in claim 22, wherein one pressure sensor is located on an edge of the mobile device.

24. The system as in claim 21, wherein:
the mobile device includes an accelerometer to measure a status of movement of the device; and
the device control module is operable to perform, after the measured status from the accelerometer indicates that the person is moving the hand-held device, the facial recognition to determine whether there is a match between the extracted facial features and known and existing facial features of an authorized user and determination of whether the detected face is from a live person based on the difference in the detected light between two of the two or more different optical illumination wavelengths.

25. The system as in claim 20, wherein:
the device structure is part of a laptop computer and is structured so that the optical imaging system and the optical probe detection module are placed to face a user when a user looks at a display screen of the laptop.

26. The system as in claim 20, wherein:
the device structure is part of an entrance to a secured premise and is structured so that the optical imaging system and the optical probe detection module are placed to face a user when a user looks at a display screen.

27. The system as in claim 20, wherein:
the device structure is part of a vehicle and is structured so that the optical imaging system and the optical probe detection module are placed to face a user when a user looks at a display screen.

28. The system as in claim 20, wherein:
the one or more probe light sources are structured to generate the two or more different optical illumination wavelengths of the probe light in a way that the optical reflections from pupils of the person's eyes are measurably different in signal strength to allow the measured difference in the detected optical reflections from pupils of the person's eyes as an indicator for whether the detected face is from a live person.

29. The system as in claim 20, wherein:
the one or more probe light sources are structured to generate the two or more different optical illumination wavelengths of the probe light in a way that causes different levels of optical absorption by the facial skin of a live person so that beam spot sizes of the probe light that penetrates into the facial skin due and is scattered by the facial skin at the two or more different optical illumination wavelengths are measurably different;
the optical probe detection module is operable to capture images of the beam spots; and
the device control module is operable to process the captured images of the beam spots at the two or more different optical illumination wavelengths to measure a difference in the beam spots; and use the measured difference to determine whether the detected face is from a live person as an additional part of facial recognition.

30. The system as in claim 20, wherein:
one of the two or more different optical illumination wavelengths of the probe light has a wavelength of 942 nm at which a live person's vitreous humor in the pupil or facial skin exhibits strong optical absorption; and another of the two or more different optical illumination wavelengths of the probe light is spectrally positioned away from 942 nm at a selected optical illumination wavelength at which a live person's vitreous humor in the pupil or facial skin exhibits a measurably less optical absorption.

31. The system as in claim 30, wherein:

the selected optical illumination wavelength of the other of the two or more different optical illumination wavelengths of the probe light spectrally positioned away from 942 nm at 850 nm.

32. The system as in claim 20, wherein the optical probe detection module includes:

a first infrared optical sensor array of infrared optical detectors structured to detect light at a first optical illumination wavelength; and a second, separate infrared optical sensor array of infrared optical detectors structured to detect light at a second, different optical illumination wavelength.

* * * * *